(12) United States Patent
Weng

(10) Patent No.: US 7,440,685 B2
(45) Date of Patent: Oct. 21, 2008

(54) THREE-DIMENSIONAL PHOTOGRAPHIC SHELF

(76) Inventor: Jia Duo Weng, 4F, 42, Shui nan Street, Luchou City, Taipei Hsien (TW)

( * ) Notice: Subject to any disclaimer, the term of this patent is extended or adjusted under 35 U.S.C. 154(b) by 249 days.

(21) Appl. No.: 11/281,726

(22) Filed: Nov. 18, 2005

(65) Prior Publication Data

US 2006/0147188 A1    Jul. 6, 2006

(30) Foreign Application Priority Data

Jan. 6, 2005    (TW) ............................... 094100379

(51) Int. Cl.
*G03B 15/00* (2006.01)
*G03B 17/00* (2006.01)
(52) U.S. Cl. ..................... 396/5; 396/419; 396/422; 396/428
(58) Field of Classification Search .............. 396/5, 396/419, 556, 422, 428
See application file for complete search history.

(56) References Cited

U.S. PATENT DOCUMENTS

| 2,567,068 | A | * | 9/1951 | Halmer ................... 248/184.1 |
| 3,491,669 | A | * | 1/1970 | McBride ..................... 396/329 |
| 4,348,097 | A | * | 9/1982 | Sippel ........................ 396/428 |
| 4,649,277 | A | * | 3/1987 | Terra et al. ............. 250/363.05 |
| 5,033,705 | A | * | 7/1991 | Reagan .................. 248/123.11 |
| 6,517,207 | B2 | * | 2/2003 | Chapman .................... 352/243 |

* cited by examiner

*Primary Examiner*—W. B. Perkey
*Assistant Examiner*—Michael A Strieb
(74) *Attorney, Agent, or Firm*—Troxell Law Office, PLLC

(57) ABSTRACT

A three-dimensional photographic shelf that is highly controllable, adjustable and portable. A loading turntable of the shelf for loading a photographic subject has the functions of horizontal rotation for different angles and vertical angles switches while cooperating with a hand rod connected to a digital camera.

10 Claims, 4 Drawing Sheets

THREE-DIMENSIONAL PHOTOGRAPHIC SHELF

FIELD OF THE INVENTION

The present invention relates to a three-dimensional photographic shelf, more specifically to a shelf being able to position and rotate a subject relative to a camera.

BACKGROUND OF THE INVENTION

Popularization of the Internet has brought drastic changes to the way people are handling their business affairs. With digital development, we have entered an age of high speed, broadband and highly interactive communication. Many applications have become mature. Because the technology of displaying interactive objects of three-dimensional real images is beginning to prove its usefulness, we can expect there will be considerable space for the growth and demand of its applications.

The current market has seen the development of related software and hardware, mainly stitching software of three-dimensional images and tripod supports of auxiliary photographic equipment. Though related equipment has been introduced in this country for practical application, it has shown no result of convenience, high quality, and high efficiency application. The reasons may include: insufficient precision in positioning function of existing equipment, inconvenience in the operation of a semi-automatic control motor for computer software, failure of equipment design to satisfy professional photographic job requirements, failure to achieve high applicability, etc. Besides, as far as conventional design of similar products is concerned, the production and application costs may be high. The similar products could not satisfy the needs of both amateurs and professional users. Therefore, the present invention has been designed to make drastic improvement on the above inadequacies.

In view of the inadequacy of conventional technology, the present inventor has come up with the present invention, based on many years of experience in planar and three-dimensional photography, of a three-dimensional photography shelf, where the object to be photographed can be rotated on rotating arms. The object-carrying turntable has the function of horizontal rotation in all angles and a rotating arm with a screw fastened digital camera for vertical angle variation. It has high maneuverability, adjustability and portability, to significantly enhance working range and quality.

Characteristics of design of the present invention of photography rack include the following:

1. Precision and Convenience in Operation:

a) Manual mechanical design—No problem in compatibility of software and hardware; convenient and accurate control of horizontal rotating angles of the loading turntable, and vertical rotating angles of the raised part. The camera can focus on a same center point to facilitate all-round photography.

b) The control gearbox is designed in each positioning notch of five degrees. The rotation (degrees) of the handle is equal to the rotating angle of the loading turntable. Two sets of gears are used for transmission control. A positioning ball to move it into position with a click confirms turning of every five degrees. It has high maneuverability, so the user can control horizontal angles with his left hand, and control the camera shutter with his right hand, while his eyes are concentrated on the object to be photographed and the image in the camera viewfinder.

c) The arm joint of the raised part for controlling vertical angles is a safety design of a ratchet having 72 teeth. In keeping with horizontal rotating angles, each tooth equals five degrees. To suit photo-taking requirements, one-way adjustment can be made to raise vertical rotating angle. In raising process, two independent ratchet pawls inside the ratchet will click in position, giving a manual feeling of successful positioning. To lower, the user needs to simultaneously grasp two racket pawl pulling rods with one hand, and raise the arm of the raised part with another hand, so that the three layers of protection design can maintain the position of the camera, to prevent it from accidentally falling.

2. Function of a Mobile Three-Dimensional Film Studio:

a) The flexible sleeve-joint tube of the transmission shaft is designed to facilitate photography of miniature to medium sized objects, with adjustment and fixing functions to suit the needs of user, to facilitate comfortable and smooth operation, or convenient storage after use.

b) The arm of raised part can be easily lengthened or disassembled to suit the size of object to be photographed; it is equipped with an extra loading turntable set for the purpose of making necessary adjustment.

c) The elevating post of the arm of the raised part can be disassembled for storage, or assembled and tightened for use.

d) It is equipped with multiple sets of lighting fixtures and mobile backdrop gears, and simplified basic equipment, and capable of achieving the lighting effects of professional film studio, to reduce the need of after-treatment of images.

e) Materials include mainly aluminum alloy. The entire set of equipment can be collapsed and put into a castor-wheeled aluminum flight case (H30×W60×D50). It has a total weight of approximately 18 kg, which is light enough, durable and convenient for portability.

3. Low Costs in Use:

a) Manual mechanical design; without having to operate or control hardware or software; no restriction on the types of camera; no problems concerning electrical specifications; no need of maintenance; robust and trouble-free; and extended working life.

b) High adjustability and high maneuverability by user to enhance working scope and quality.

c) Parts of the entire set of equipment are interchangeable, to significantly simplify installing processes, and reduce the time for storage and transportation, and economic costs.

d) Because of its integrated functions, lightweight, compact size and high portability, the entire equipment (including camera, makeshift studio lighting) can be carried by one person to a designated location to accomplish the job.

SUMMARY OF THE INVENTION

The primary objective of the present invention is to provide a three-dimensional photographic shelf, which is able to vertically adjust angles by way of rotation of a hand rod, a ratchet turntable, etc. A loading turntable can be rotated horizontally with different angles and a raised part for screwing in a digital camera. To rotate the hand rod is to vertically adjust different angles, thus the present invention is controllable, adjustable and portable.

DETAILED DESCRIPTION OF SOME EMBODIMENTS

Figure 1:
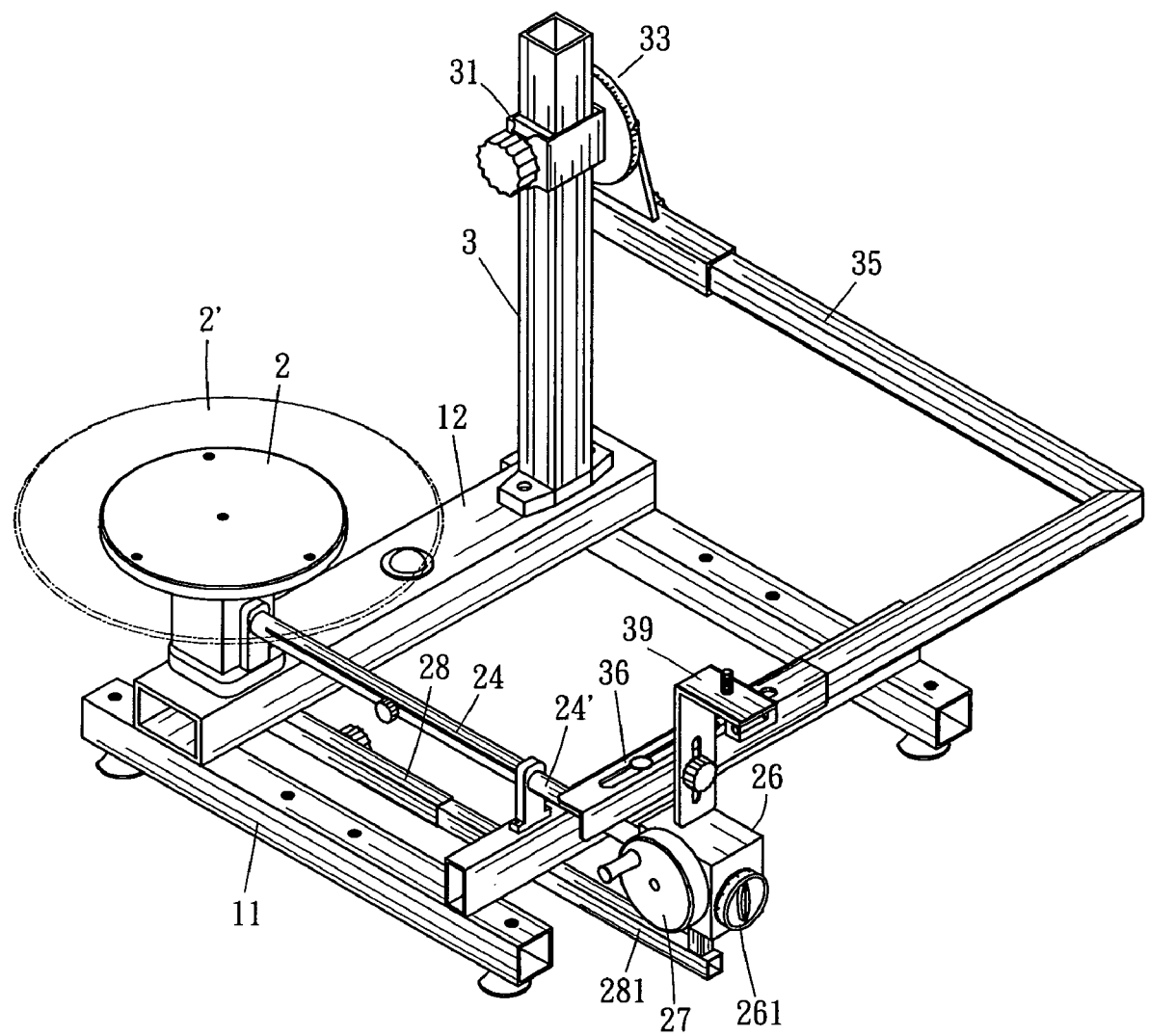
FIG. 1 is a 3-D sketch of the present invention.
Figure 2:
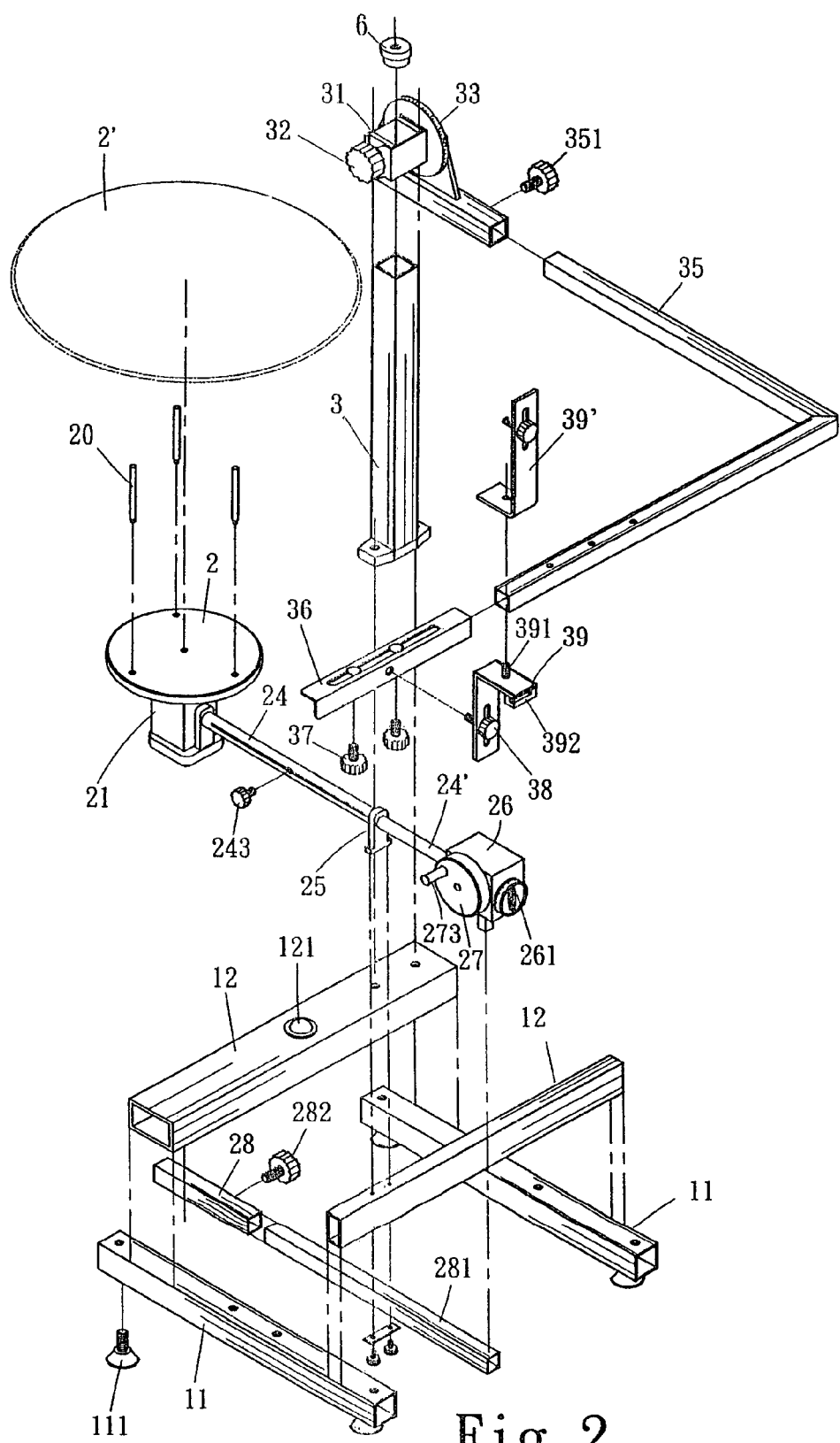
FIG. 2 is an exploded sketch of the present invention.
Figure 3:
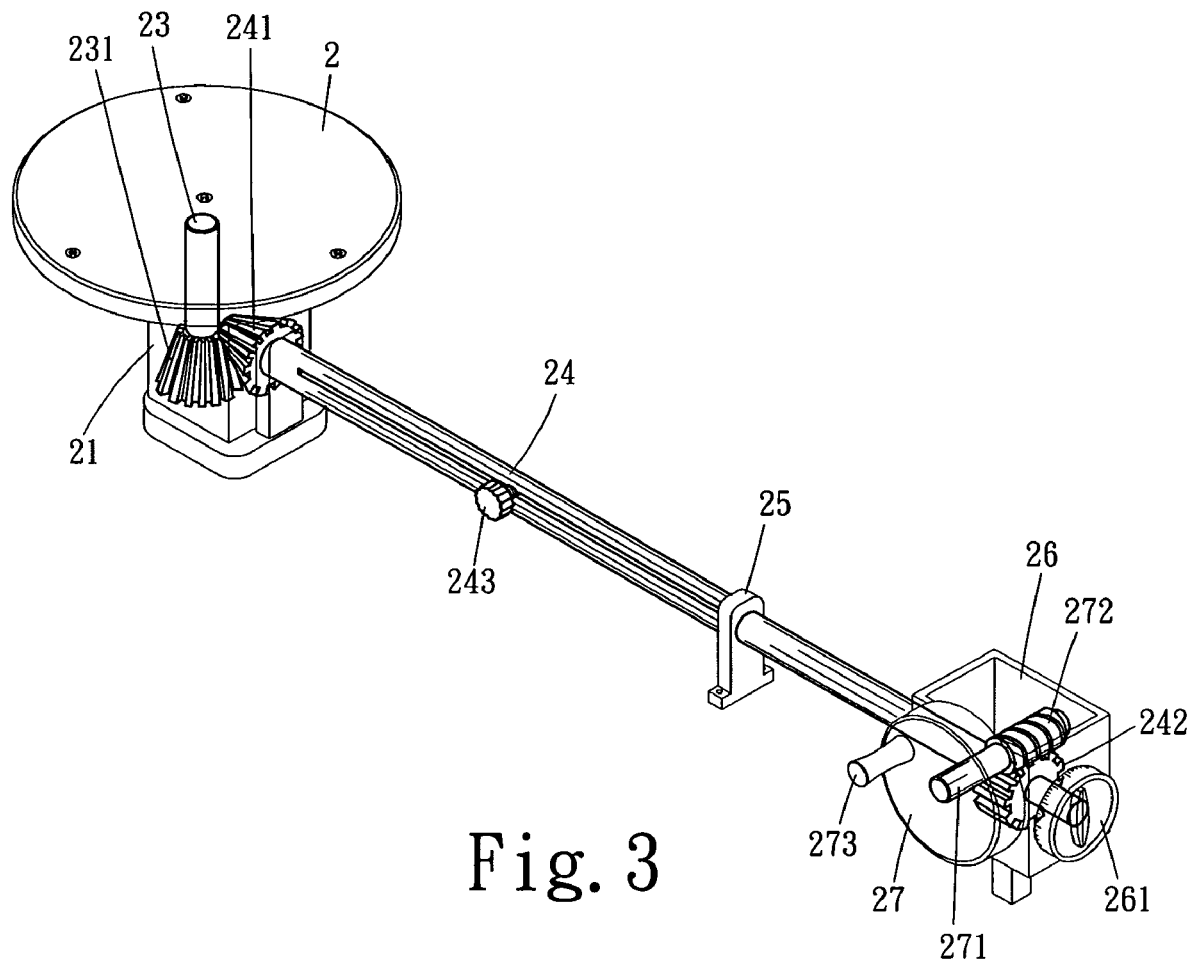
FIG. 3 is a 3-D sketch of a transmission portion of a loading turntable of the present invention.

Please refer to FIG. 1, FIG. 2 and FIG. 3, which show the three-dimensional photographic shelf. The shelf comprises a base foot frame including a plurality of crossbeams 11 and girders 12, wherein a girder 12 has a leveler 121. A loading turntable 2 and a main column 3 are mounted to opposing ends of the girders 12. The loading turntable 2 can add fixing sustaining rods 20 for placing smaller photographic subjects. A transmission box 21 is located under the loading turntable 2.

The transmission box 21 is connected to a spindle 23 of the loading turntable 2. The spindle 23 connects to an umbrella-type gear 231. A first end of a transmission shaft 24 has a transmission gear 241 meshing with the umbrella-type gear 231. A second end of the transmission shaft 24 is supported by a bearing base 25 and inserted into a controlling gear box 26 by means of a sleeve-joint tube 24'. The controlling gear box 26 has a scale positioning gear 261 located on a side opposite the transmission shaft 24.

An end of the sleeve-joint tube 24' of the transmission shaft 24 connecting to the controlling gear box 26 has a gear 242. The gear 242 may mesh with a vertical gear shaft 272 connected to a spindle 271 of a turntable 27. An outer edge of the turntable 27 has a turn handle 273.

A fixing tube 28 is located under the controlling gear box 26. The fixing tube 28 connects to an elongating tube 281. The controlling gear box 26 can be adjusted to move right and left by means of the sleeve-joint tube 24' and the elongating tube 281 which are then selectively fixed by bolts 243 and 282. Therefore a horizontal angle is set more precise and vibration is avoided.

The loading turntable 2 for placing photographic subjects M can be rotated by the turn handle 273 and selectively positioned for each 5 or 10 degrees. The rotating degree of the turn handle 273 is equal to the rotating angle of the loading turntable 2, according to two sets of gears for transmission. A positioning ball may sound for confirmation while rotation of each 5 or 10 degrees, thus the loading turntable 2 is highly controllable.

Figure 4:
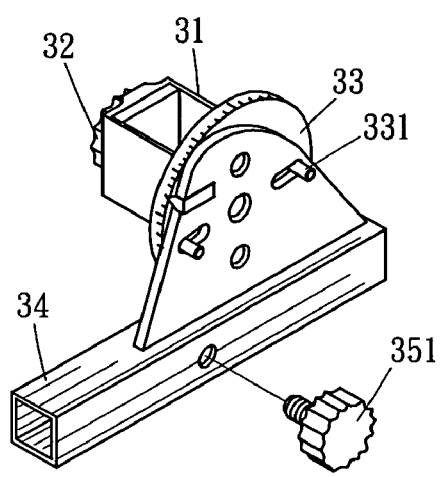
FIG. 4 is a 3-D sketch of the back of a ratchet turntable of the present invention.

A height-adjusting frame 31 is adjustably mounted on the main column 3 and selectively fixed by a bolt 32, see FIG. 2 and FIG. 4. The back of the height-adjusting frame 31 connects to a ratchet turntable 33. A bottom of the ratchet turntable 33 has a thimble 34. An end of the thimble 34 is inserted by a hand rod 35 and fixed by a bolt 351. A digital camera is connected to a tail end of the hand rod 35. The tail end of the hand rod 35 can have an adjusting piece 36 for adjusting positions of the digital camera C. The adjusting piece 36 is fixed by a set of bolts 37.

A raised part 39 connected to the digital camera C is connected to a side of the adjusting piece 36 by means of a bolt 38. A screwing column 391 of the raised part 39 is for fixing the digital camera C. Thus the digital camera C can be fixed vertically. A vertical taking and switching frame 39' can be added. The raised part 39 has a leveler 392.

The ratchet turntable 33 can directly twist and connect to the hand rod 35 for controlling vertical angles. A buckling ratchet and a press-control rod 331 are located in the ratchet turntable 33. When the press-control rod 331 is pressed toward a center of the ratchet turntable 33, the hand rod 35 must be supported to prevent the digital camera C from dropping down suddenly.

An elongating tube 341 can be inserted between the thimble 34 and the hand rod 35 to extend positions of the digital camera C for taking photos of large photographic subjects M. The loading turntable 2 can have a larger table 2' for placing the larger photographic subjects M.

Figure 5:
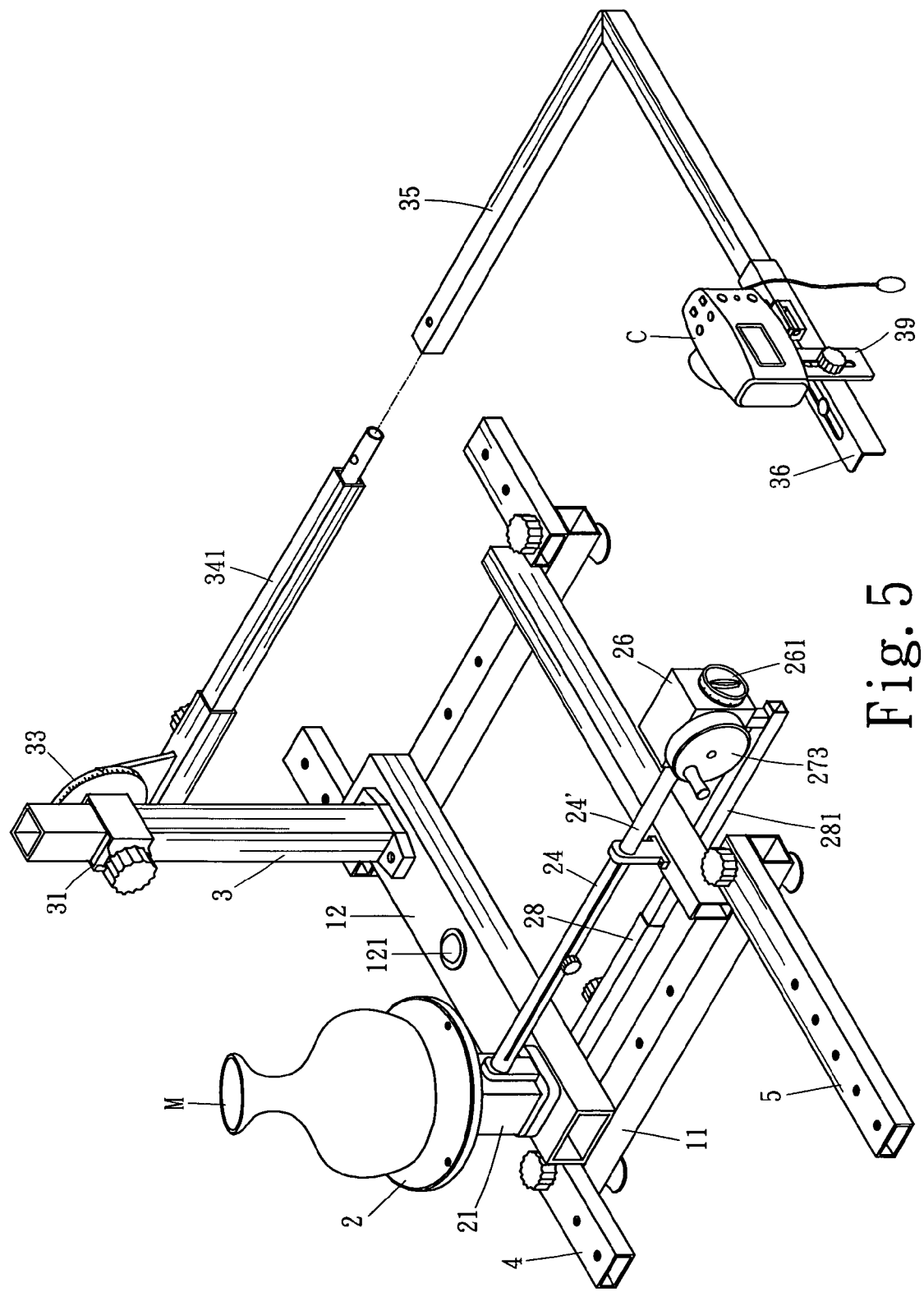
FIG. 5 is a 3-D sketch of a preferred embodiment of the present invention.

Referring to FIGS. 2 and 5, a pad 111 for adjusting horizontal positions is added to a bottom of each of crossbeams 11. Each crossbeam 11 can include a light set or auxiliary rods 4 and 5 for backdrop accessories. Another light set or an auxiliary connector 6 for backdrop accessories can be added to a place beyond the main column 3 for providing light sources or backdrop auxiliaries.

While in operation, the loading turntable 2 and the subject M can be rotated based on demanded angles per time by way of rotating the turn handle 273 by a single hand, and the digital camera C can be rotated around the subject M based on demanded angles per time by way of twisting the hand rod 35, therefore the digital camera C is capable of taking surrounding horizontal and vertical pictures.

According to aforesaid, the present invention is handled only by one operator so as to be controllable, adjustable and portable. Thus, the scope of working and the effect of quality are highly increased.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A three-dimensional photographic shelf for a digital camera comprising:

a) a base foot frame having a plurality of crossbeams and a plurality of girders;
   b) a loading turntable mounted on a first end of a first girder of the plurality of girders, the loading turntable is driven by a spindle, an umbrella-type gear is connected to the spindle, a transmission gear is connected to a first end of a transmission shaft and engages the umbrella-type gear;
   c) a controlling gear box having a scale positioning gear, a gear connected to the scale positioning gear and controlling a rotation of the transmission shaft, a gear shaft engaging the gear, a turntable connected to the gear shaft, and a turn handle connected to the turntable of a controlling gear box, wherein a rotation of the turn handle controlling a rotation of the loading turntable; and
   d) a main column mounted on a second end of the first girder of the plurality of girders and having a height-adjusting frame mounted thereon, a ratchet turntable is connected to a back of the height-adjusting frame, the ratchet turntable has a thimble located on a bottom thereof, a first end of a hand rod is connected to the thimble, the digital camera is connected to a second end of the hand rod,
   wherein the loading turntable and the subject are rotated to predetermined angles per time by rotating the turn handle, and the digital camera is rotated around the subject based on predetermined angles per time by selectively positioning the hand rod.

2. The three-dimensional photographic shelf according to claim 1, further comprising a fixing tube located under the controlling gear box, and an elongating tube connected to the fixing tube, the controlling gear box is adjusted to move right and left by a sleeve-joint tube and the elongating tube of the spindle and selectively fixed by bolts.

3. The three-dimensional photographic shelf according to claim 1, further comprising a plurality of pads, one pad of the plurality of pads is connected to a bottom of each of the plurality of crossbeams and selectively adjusting a horizontal position thereof.

4. The three-dimensional photographic shelf according to claim 1, further comprising a leveler connected to each girder of the plurality of girders.

5. The three-dimensional photographic shelf according to claim 1, further comprising an elongating tube located between the thimble and the hand rod to extend positions of the digital camera, the loading turntable has device selected from a group consisting of a larger table for placing larger subjects and a plurality of fixing sustaining rods for placing smaller subjects.

6. The three-dimensional photographic shelf according to claim 1, wherein each crossbeam of the plurality of crossbeams has a light set or auxiliary rods for backdrop accessories, another light set or an auxiliary sleeve for backdrop accessories is added to a place beyond the main column for providing light sources or backdrop auxiliaries.

7. The three-dimensional photographic shelf according to claim 1, wherein the scale positioning gear of the controlling gear box is positioned by a positioning ball for rotating each 5 or 10 degrees and sound for confirmation.

8. The three-dimensional photographic shelf according to claim 1, wherein the ratchet turntable directly twists and is connect to the hand rod for controlling vertical angles, a buckling ratchet and a press-control rod are located in the ratchet turntable, wherein, the hand rod is movable when the press-control rod is moved toward a center of the ratchet turntable.

9. The three-dimensional photographic shelf according to claim 1, further comprising an adjusting piece located on a second end of the hand rod for selectively adjusting positions of the digital camera.

10. The three-dimensional photographic shelf according to claim 9, wherein the adjusting piece has a raised part located on a side thereof for connecting to the digital camera and fixing the digital camera vertically, and the adjusting piece has a vertical taking and switching frame, the raised part has a leveler.

* * * * *